(12) United States Patent
Kureishi et al.

(10) Patent No.: US 12,180,009 B2
(45) Date of Patent: Dec. 31, 2024

(54) TRANSPORT DEVICE

(71) Applicant: IL PHARMA PACKAGING CO., LTD., Ichinomiya (JP)

(72) Inventors: Mitsuhiro Kureishi, Ichinomiya (JP); Hironori Iwamatsu, Ichinomiya (JP); Akira Sumitani, Ichinomiya (JP); Shinichi Tanaka, Ichinomiya (JP); Hiroyuki Ito, Ichinomiya (JP); Akiyoshi Ando, Ichinomiya (JP)

(73) Assignee: IL PHARMA PACKAGING CO., LTD., Aichi (JP)

(*) Notice: Subject to any disclaimer, the term of this patent is extended or adjusted under 35 U.S.C. 154(b) by 22 days.

(21) Appl. No.: 18/252,404

(22) PCT Filed: Nov. 15, 2021

(86) PCT No.: PCT/JP2021/041960
§ 371 (c)(1),
(2) Date: May 10, 2023

(87) PCT Pub. No.: WO2022/107731
PCT Pub. Date: May 27, 2022

(65) Prior Publication Data
US 2023/0416006 A1    Dec. 28, 2023

(30) Foreign Application Priority Data

Nov. 17, 2020 (JP) .................... 2020-190885

(51) Int. Cl.
*B65G 17/34* (2006.01)
*B65G 17/06* (2006.01)
(Continued)

(52) U.S. Cl.
CPC ........... *B65G 17/34* (2013.01); *B65G 17/067* (2013.01); *B65G 17/24* (2013.01); *B65G 17/46* (2013.01);
(Continued)

(58) Field of Classification Search
CPC ...... B65G 17/34; B65G 17/067; B65G 17/24; B65G 17/46; B65G 21/2072;
(Continued)

(56) References Cited

U.S. PATENT DOCUMENTS 3,599,776 A    8/1971  Babunovic
4,667,804 A *  5/1987  Dubuit ............... B65G 35/06
                                                 198/465.1
(Continued)

FOREIGN PATENT DOCUMENTS

EP    0447123 A1    9/1991
JP    S4933467 B1   9/1974
(Continued)

OTHER PUBLICATIONS

International Search Report and English translation thereof, of International Application No. PCT/JP2021/041960, mail date Feb. 1, 2022, 5 pages.
(Continued)

*Primary Examiner* — Mark A Deuble
(74) *Attorney, Agent, or Firm* — Grossman, Tucker, Perreault & Pfleger, PLLC; Steven J. Grossman (57) ABSTRACT

Provided is a transport device that can transport two or more types of articles without necessarily requiring a change of parts. The transport device includes a guide extending in a transport direction of an article, and a holding unit configured to hold the article between the holding unit and the guide and to move in the transport direction. The holding unit includes two or more roller units. In each roller unit, two or more rollers, including a first roller and a second roller with a diameter larger than a diameter of the first roller, are aligned along an axial direction. The holding unit is movable in the axial direction. The holding unit is moved in the axial direction to thereby switch the rollers abutting the article among the two or more rollers.

6 Claims, 12 Drawing Sheets

(51) Int. Cl.
  *B65G 17/24*  (2006.01)
  *B65G 17/46*  (2006.01)
  *B65G 21/20*  (2006.01)

(52) U.S. Cl.
  CPC ............... *B65G 21/2072* (2013.01); *B65G 2201/0244* (2013.01)

(58) Field of Classification Search
  CPC ............ B65G 2201/0244; B65G 17/22; B65G 17/42; B65G 2207/08; B65C 3/06; B65C 9/02
  See application file for complete search history.

(56) References Cited

U.S. PATENT DOCUMENTS

| | | | | |
|---|---|---|---|---|
| 4,726,898 | A * | 2/1988 | Mills | B65G 47/24 209/939 |
| 5,161,664 | A | 11/1992 | LeBras | |
| 6,267,221 | B1 * | 7/2001 | Bisi | B65G 23/06 198/359 |
| 6,889,485 | B2 * | 5/2005 | Davaillon | B65G 47/845 53/448 |
| 8,016,538 | B2 * | 9/2011 | Monti | B65B 1/46 141/168 |
| 9,723,952 | B2 * | 8/2017 | Janecka | B65G 17/24 |
| 11,447,284 | B2 * | 9/2022 | Monti | B65C 9/045 |
| 11,866,270 | B2 * | 1/2024 | Bonnain | B65G 47/36 |

FOREIGN PATENT DOCUMENTS

| | | |
|---|---|---|
| JP | H1285523 A | 11/1989 |
| JP | 14235823 A | 8/1992 |
| JP | H4235825 A | 8/1992 |
| JP | H5132135 A | 5/1993 |
| JP | 4249969 B2 | 4/2009 |
| JP | 2010215244 A | 9/2010 |

OTHER PUBLICATIONS

International Search Report and English translation thereof, of International Application No. PCT/JP2021/04160, mail date Feb. 1, 2022, 5 pages.

International Preliminary Report on Patentability and Written Opinion of the International Searching Authority, with English translation, of International Application No. PCT/JP2021/041960, mail date Jun. 1, 2023, 8 pages.

* cited by examiner

TRANSPORT DEVICE

CROSS-REFERENCE TO RELATED APPLICATION

This international application claims the priority of Japanese Patent Application No. 2020-190885 filed on Nov. 17, 2020 with the Japan Patent Office, and the entire disclosure of Japanese Patent Application No. 2020-190885 is incorporated in this international application by reference.

TECHNICAL FIELD

The present disclosure relates to a transport device.

BACKGROUND ART

A transport device for transporting articles is disclosed in Patent Document 1. The transport device comprises two or more wheels. On an outer circumferential edge of each wheel, recesses for accommodating articles are formed.

PRIOR ART DOCUMENTS

Patent Documents

Patent Document 1: Official Gazette of Japanese Patent No. 4249969

SUMMARY OF THE INVENTION

Problems to be Solved by the Invention

The shape of the recesses is designed depending on articles to be transported. When articles to be transported are changed, the transport wheels and other parts need to be replaced with those corresponding to the articles after the change.

In one aspect of the present disclosure, it is desirable to provide a transport device capable of transporting two or more types of articles without necessarily requiring a change of parts.

Means for Solving the Problems

One aspect of the present disclosure is a transport device configured to transport an article. The transport device comprises a guide extending in a transport direction of the article, and a holding unit configured to hold the article between the holding unit and the guide and to move in the transport direction.

The holding unit comprises two or more roller units in each of which two or more rollers, including a first roller and a second roller with a diameter larger than a diameter of the first roller, are aligned along an axial direction. The holding unit is configured to be movable in the axial direction. The holding unit moves in the axial direction to thereby switch the rollers abutting the article among the two or more rollers.

The transport device according to one aspect of the present disclosure can transport two or more types of articles without necessarily requiring a change of parts.

EXPLANATION OF REFERENCE NUMERALS

1 . . . labeling system, 3 . . . container introduction device, 5 . . . transport device, 7 . . . labeling device, 9 . . . article sorting device, 11 . . . horizontal supply conveyor, 13 . . . robot, 17 . . . passage for defective products, 19 . . . table for non-defective products, 21 . . . rail unit, 23 . . . holding unit, 25 . . . guide, 25A . . . side plate, plate, 27 . . . upper rail, 29 . . . lower rail, 31 . . . upper chain, 33 . . . lower chain, 35 . . . groove, 37, 39 . . . path switching rail, 41 . . . first air cylinder, 43 . . . second air cylinder, 47 . . . third air cylinder, 49 . . . fourth air cylinder, 451 . . . first stopper, 452 . . . second stopper, 453 . . . third stopper, 454 . . . fourth stopper, 51 . . . shaft, 53 . . . slide portion, 55 . . . roller support portion, 57A, 57B . . . upper roller, 59A, 59B . . . lower roller, 61 . . . cam follower, 63, 65 . . . support plate, 65A, 65B, 67A, 67B . . . roller shaft, 101 . . . container

MODE FOR CARRYING OUT THE INVENTION

Example embodiments of the present disclosure will be described with reference to drawings.

First Embodiment

1. Configuration of Labeling System 1

Figure 1:
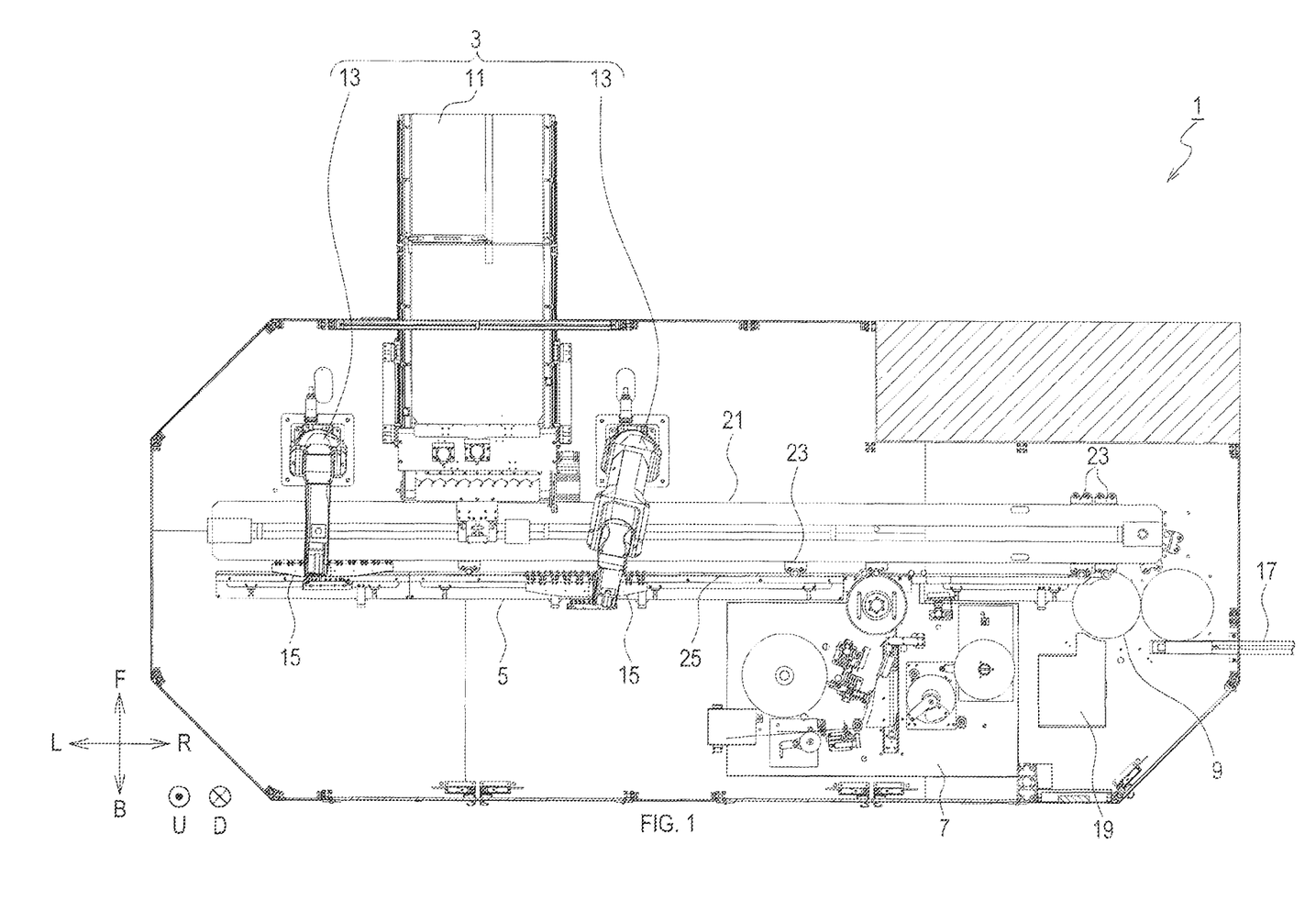
FIG. 1 is a horizontal cross-sectional view illustrating a configuration of a labeling system 1.

A configuration of a labeling system 1 will be described based on FIG. 1. The labeling system 1 is a system that attaches labels to containers. The containers correspond to objects. The right direction in FIG. 1 is referred to as a direction R, the left direction in FIG. 1 is referred to as a direction L, the downward direction in FIG. 1 is referred to as a direction B, the upward direction in FIG. 1 is referred to as a direction F, a direction orthogonal to the plane of paper in FIG. 1 and toward a viewer is referred to as a direction U, and a direction orthogonal to the plane of paper in FIG. 1 and away from the viewer is referred to as a direction D. The direction U is a vertically upward direction. The direction D is a vertically downward direction.

The labeling system 1 comprises a container introduction device 3, a transport device 5, a labeling device 7, and an article sorting device 9.

The container introduction device 3 comprises a horizontal supply conveyor 11 and two robots 13. A worker puts unlabeled containers on the horizontal supply conveyor 11. The horizontal supply conveyor 11 feeds the containers in the direction B. At the end of the horizontal supply conveyor 11 on the direction B side, ten containers are lined up in a row along the directions R, L. Each robot 13 introduces ten containers at a time to an introduction position 15 in the transport device 5.

The transport device 5 transports the containers from the introduction positions 15 in the direction R. The labeling device 7 attaches labels to the containers being transported. The transport device 5 further transports the containers to which labeling has been completed (hereinafter, referred to as labeled containers) in the direction R.

The article sorting device 9 sorts the transported labeled containers into non-defective products and defective products. Non-defective products mean containers with properly attached labels. Defective products mean containers with improperly attached labels. The article sorting device 9 sends the defective products to a passage 17 for defective products. The article sorting device 9 sends the non-defective products onto a table 19 for non-defective products.

2. Configuration of Transport Device 5

A configuration of the transport device 5 will be described based on FIG. 1 to FIG. 12. The transport device 5 comprises a rail unit 21, two or more holding units 23, and a guide 25.

Figure 2:
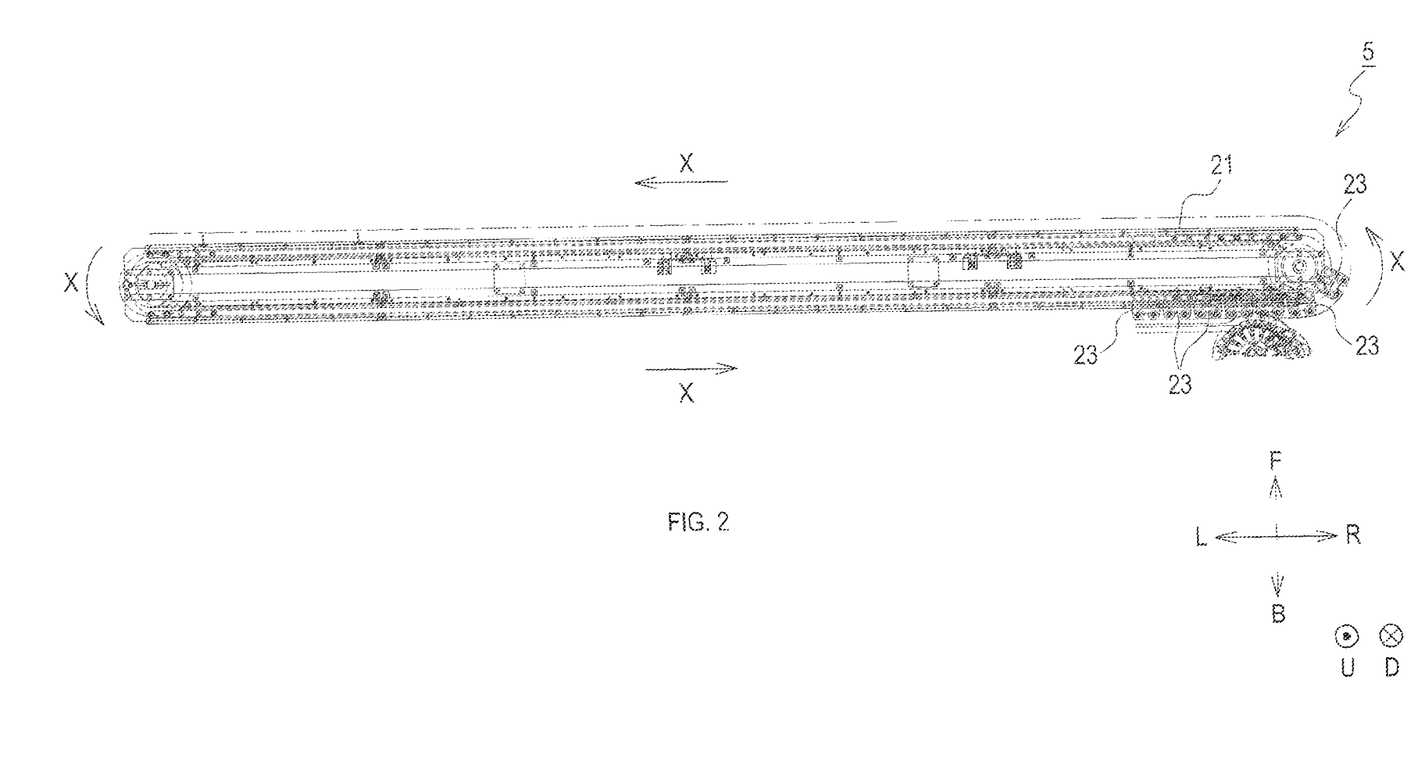
FIG. 2 is a plan view illustrating a configuration of a transport device 5.

As illustrated in FIG. 2, the rail unit 21, when seen from a viewpoint on the direction U side, has an annular shape elongated in the directions R, L.

Figure 3:
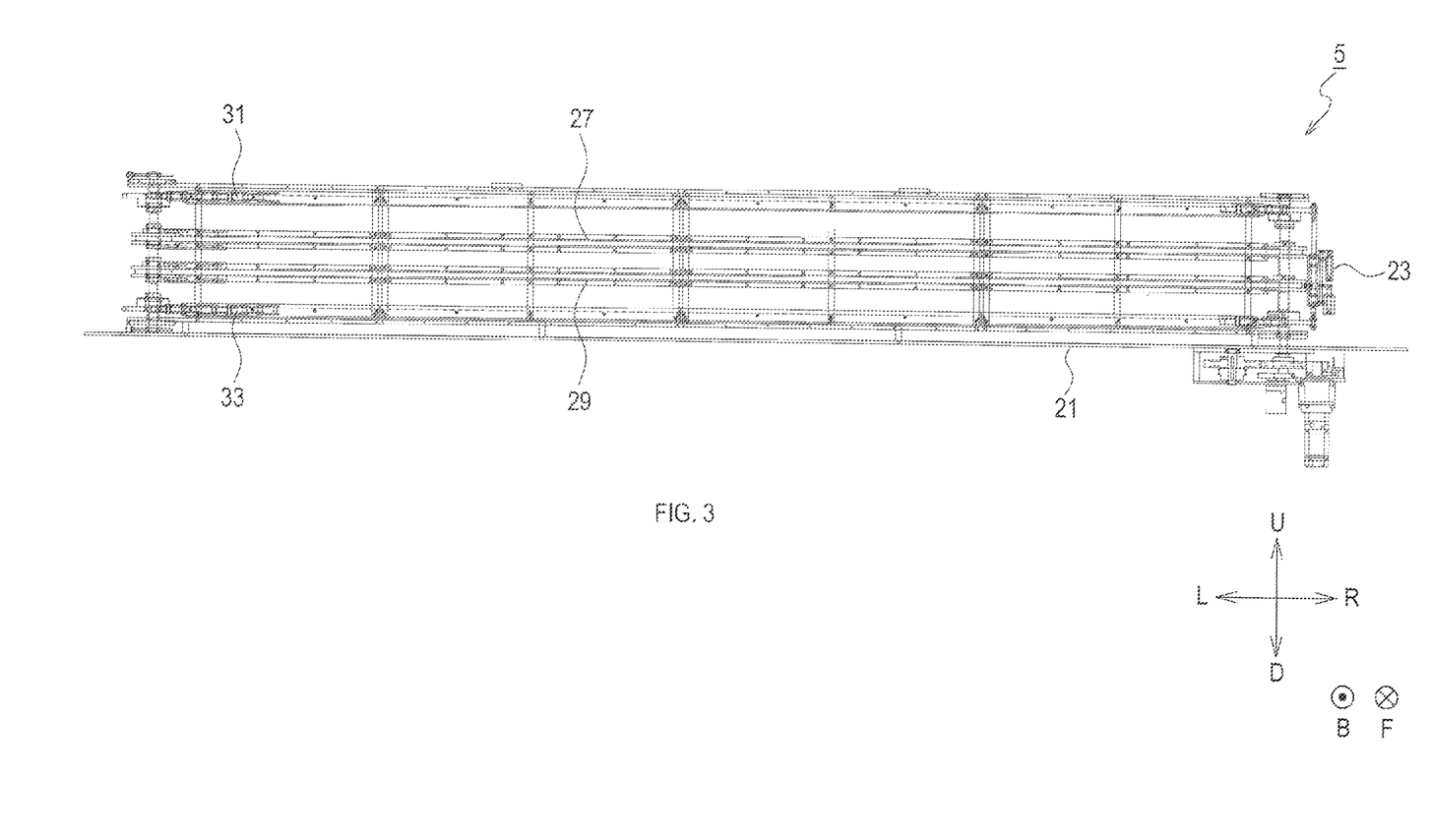
FIG. 3 is a side view illustrating a portion of the transport device 5 on a direction B side.
Figure 4:
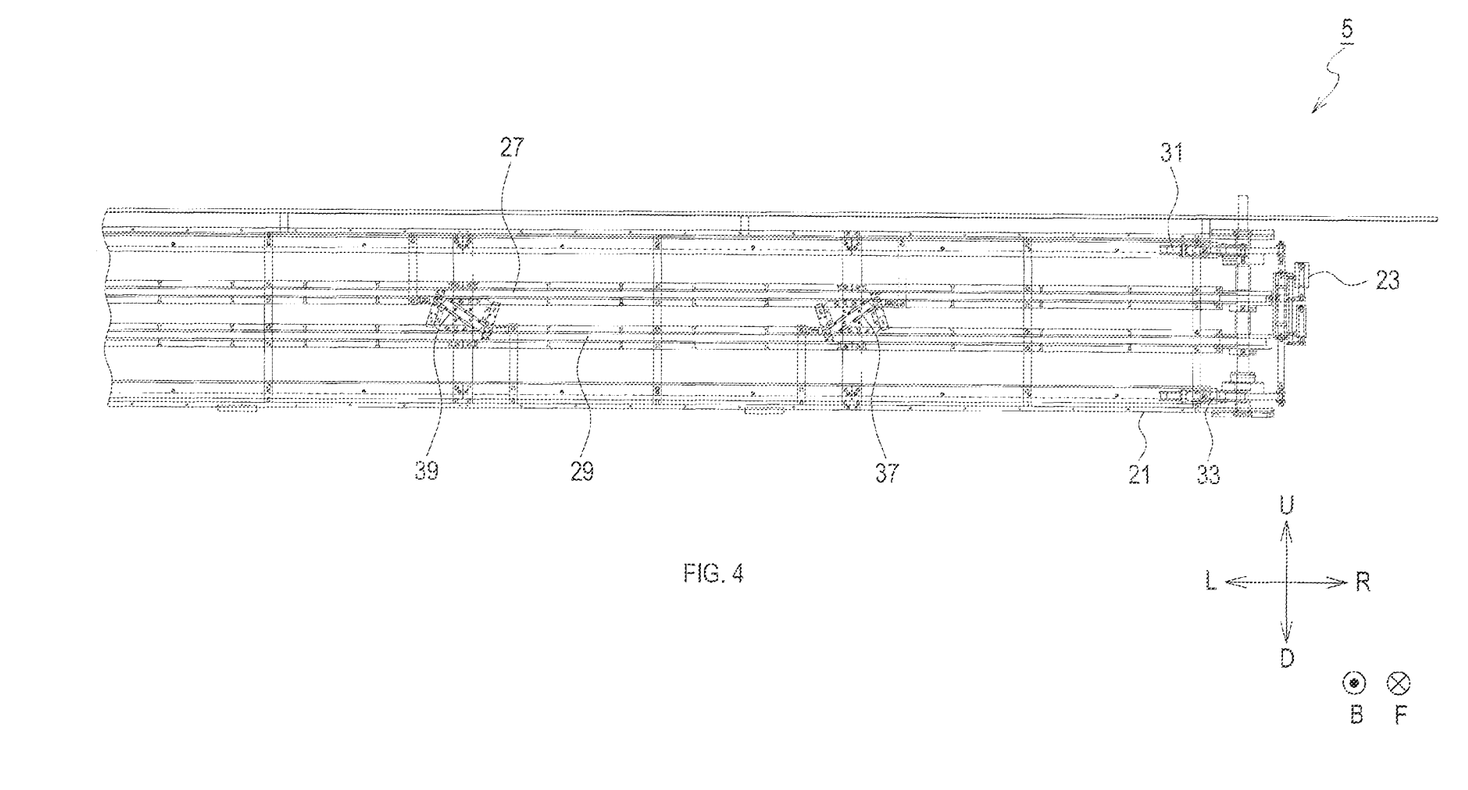
FIG. 4 is a side view illustrating a portion of the transport device 5 on a direction F side.

As illustrated in FIG. 3 and FIG. 4, the rail unit 21 comprises an upper rail 27, a lower rail 29, an upper chain 31, and a lower chain 33. Each of the upper rail 27, the lower rail 29, the upper chain 31, and the lower chain 33 extends along a circumferential direction of the annular rail unit 21. Each of the upper rail 27, the lower rail 29, the upper chain 31, and the lower chain 33 extends in the horizontal direction.

The upper chain 31 is arranged farthest on the direction U side in the rail unit 21. The upper rail 27 is arranged on the direction D side of the upper chain 31. The lower rail 29 is arranged on the direction D side of the upper rail 27. The lower chain 33 is arranged on the direction D side of the lower rail 29.

Figure 5:
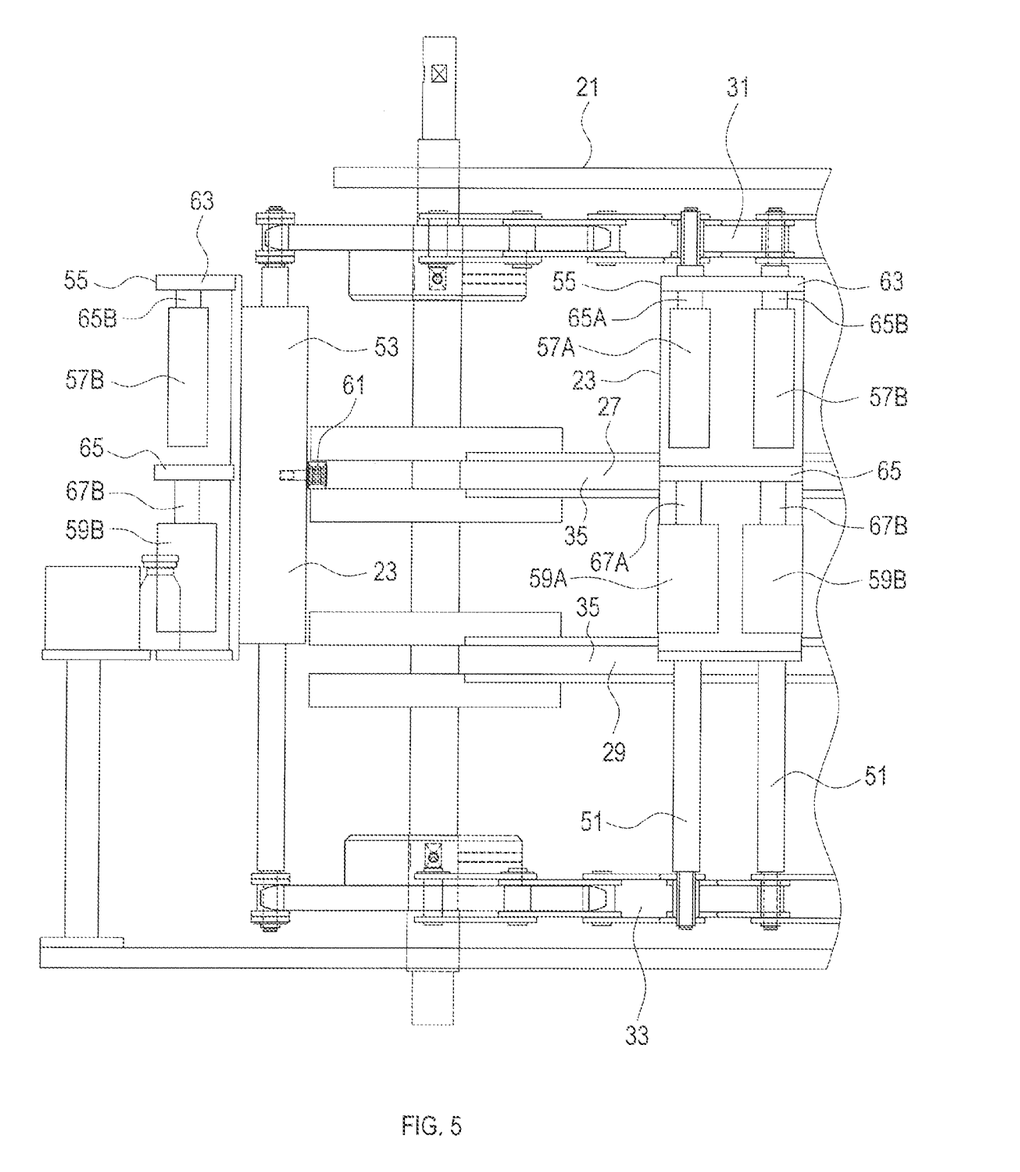
FIG. 5 is a side view illustrating a configuration of a rail unit 21 and a holding unit 23.
Figure 6:
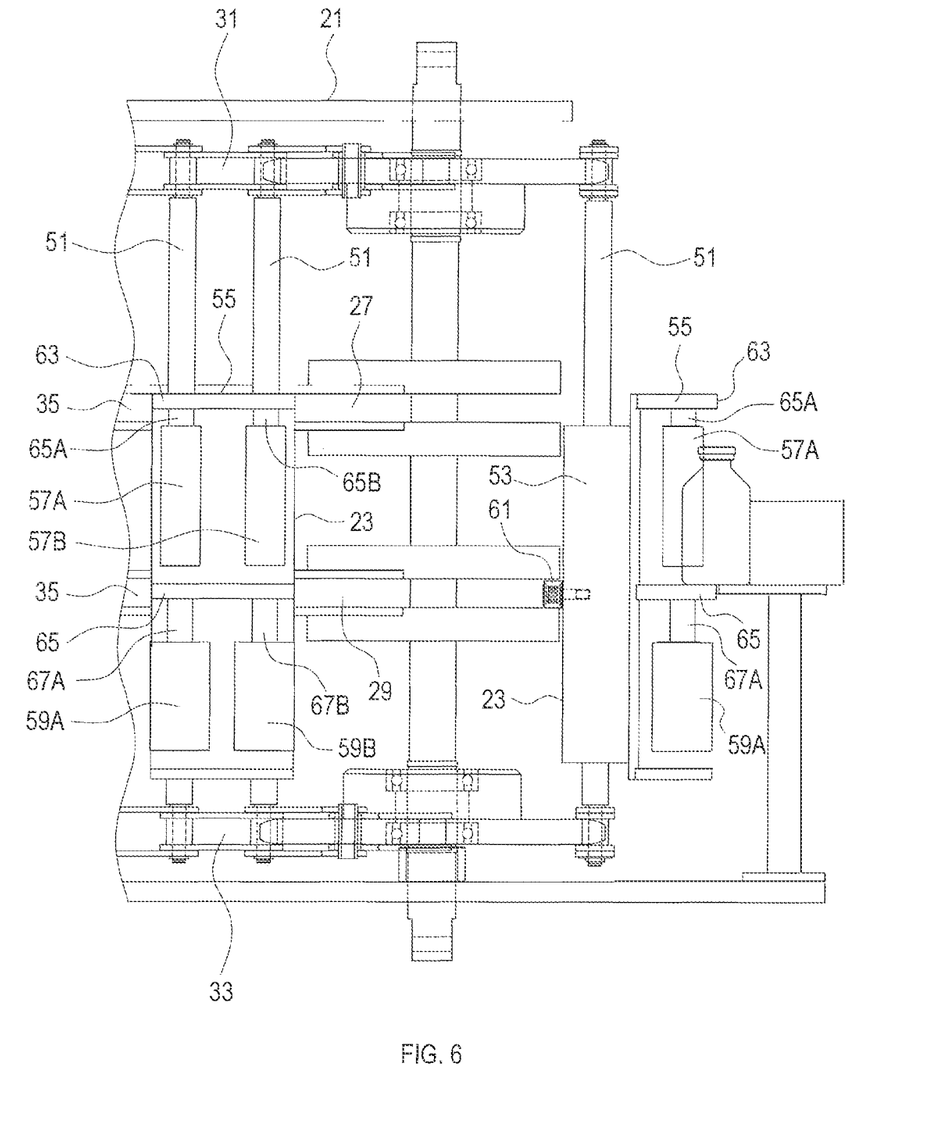
FIG. 6 is a side view illustrating a configuration of the rail unit 21 and the holding unit 23.

As illustrated in FIG. 5 and FIG. 6, the upper rail 27 is provided with a groove 35 having a recessed shape on an outer peripheral side. The outer peripheral side is, as illustrated in FIG. 2, a direction, when seen from a viewpoint on the direction U side, away from the center of the annular rail unit 21. The groove 35 extends along a longitudinal direction of the upper rail 27. The lower rail 29 is also provided with a groove 35 similarly to the upper rail 27.

As illustrated in FIG. 4, path switching rails 37, 39 are provided in portions of the rail unit 21 on the direction F side. The path switching rails 37, 39 connect the upper rail 27 and the lower rail 29. The path switching rail 37 is inclined in the direction D toward the end in the direction L. The path switching rail 39 is inclined in the direction U toward the end in the direction L.

Figure 10:
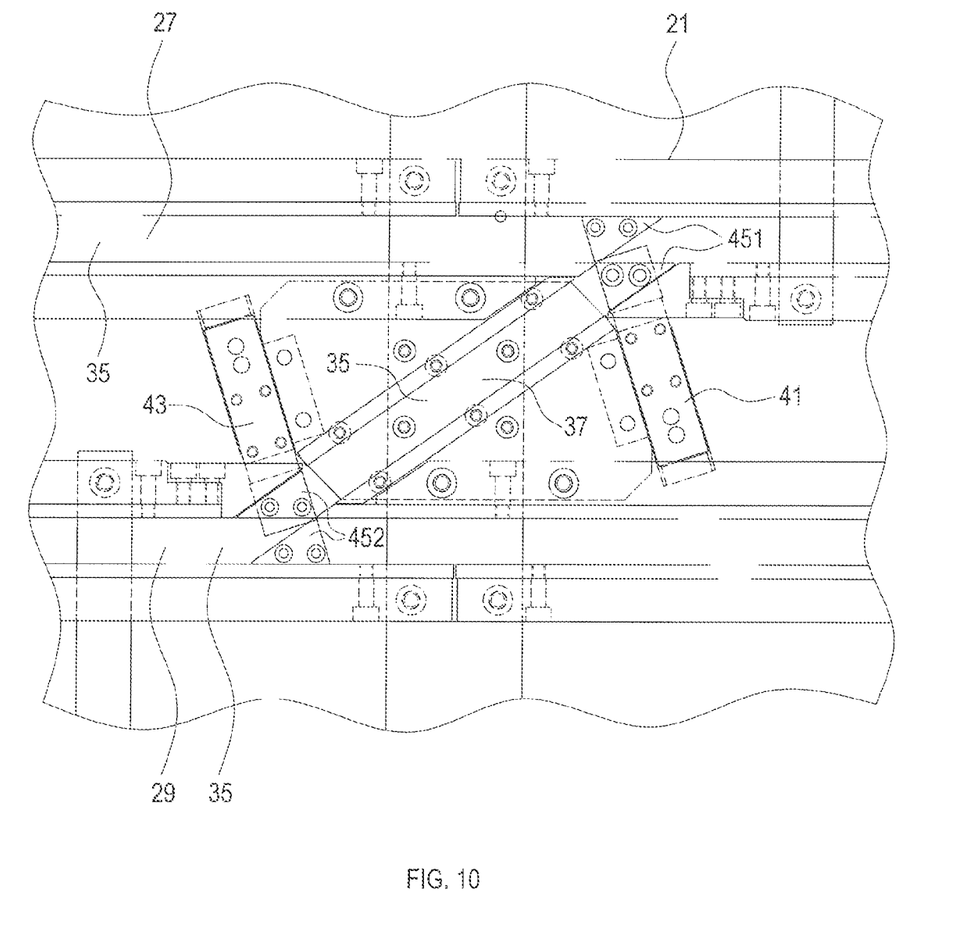
FIG. 10 is an explanatory view illustrating a configuration of a path switching rail 37.

As illustrated in FIG. 10, the path switching rail 37 is provided with a groove 35 similarly to the upper rail 27 and the lower rail 29. The groove 35 is provided on an outer peripheral side of the path switching rail 37. The groove extends along a longitudinal direction of the path switching rail 37.

In the vicinity of an intersection between the path switching rail 37 and the upper rail 27, a first air cylinder 41 is provided. In the vicinity of an intersection between the path switching rail 37 and the lower rail 29, a second air cylinder 43 is provided.

The first air cylinder 41 can move a triangular first stopper 451. The position of the first stopper 451 is at either one of a position where the groove of the upper rail 27 is closed and the groove 35 of the path switching rail 37 is opened, or a position where the groove 35 of the path switching rail 37 is closed and the groove 35 of the upper rail 27 is opened.

The second air cylinder 43 can move a triangular second stopper 452. The position of the second stopper 452 is at either one of a position where the groove 35 of the lower rail 29 is closed and the groove 35 of the path switching rail 37 is opened, or a position where the groove 35 of the path switching rail 37 is closed and the groove 35 of the lower rail 29 is opened.

Figure 11:
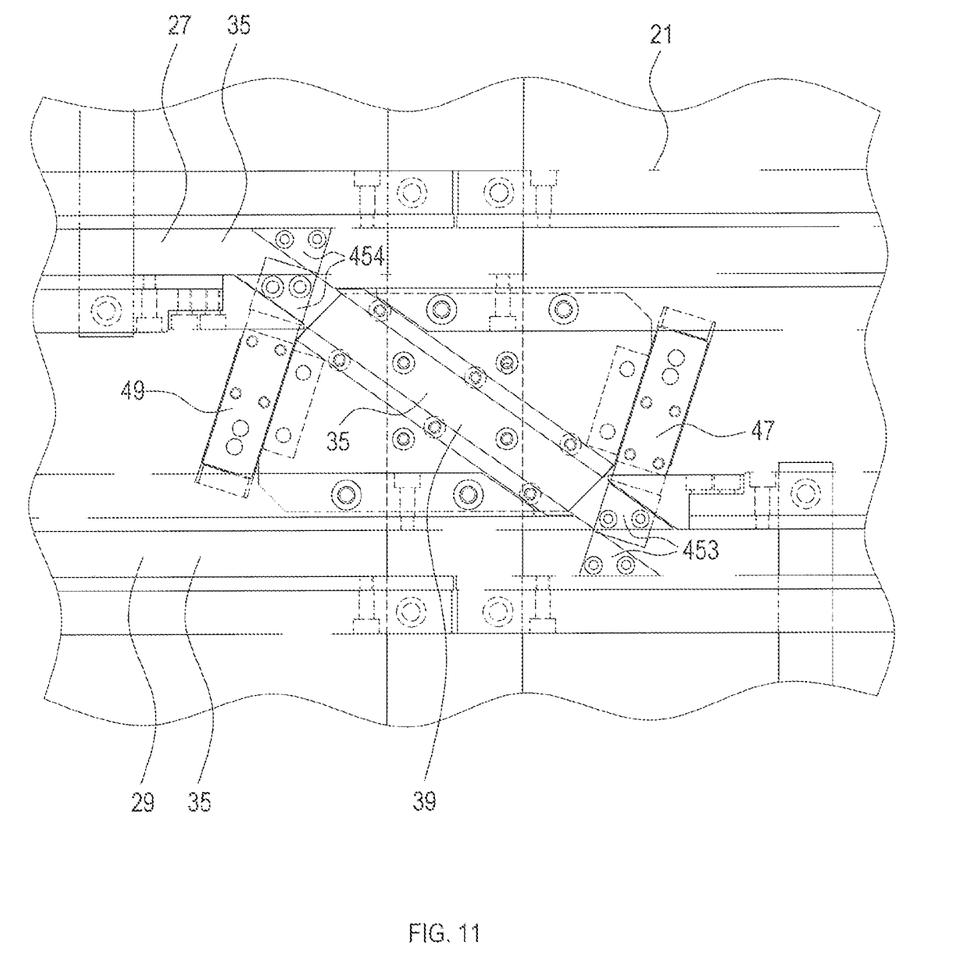
FIG. 11 is an explanatory view illustrating a configuration of a path switching rail 39.

As illustrated in FIG. 11, the path switching rail 39 is provided with a groove 35 similarly to the upper rail 27 and the lower rail 29. The groove 35 is provided on an outer peripheral side of the path switching rail 39. The groove extends along a longitudinal direction of the path switching rail 39. In the vicinity of an intersection between the path switching rail 39 and the lower rail 29, a third air cylinder 47 is provided. In the vicinity of an intersection between the path switching rail 39 and the upper rail 27, a fourth air cylinder 49 is provided.

The third air cylinder 47 can move a triangular third stopper 453. The position of the third stopper 453 is at either one of a position where the groove of the lower rail 29 is closed and the groove 35 of the path switching rail 39 is opened, or a position where the groove 35 of the path switching rail 39 is closed and the groove 35 of the lower rail 29 is opened.

The fourth air cylinder 49 can move a triangular fourth stopper 454. The position of the fourth stopper 454 is at either one of a position where the groove of the upper rail 27 is closed and the groove 35 of the path switching rail 39 is opened, or a position where the groove 35 of the path switching rail 39 is closed and the groove 35 of the upper rail 27 is opened.

The upper chain 31 and the lower chain 33 are rotated by a driving force of a drive source, which is not shown, in a direction X illustrated in FIG. 2. In a portion of the rail unit 21 on the direction B side, the upper chain 31 and the lower chain 33 move in the direction R. The direction R corresponds to the transport direction. The speed of the upper chain 31 and the speed of the lower chain 33 are the same.

As illustrated in FIG. 5 and FIG. 6, the holding unit 23 comprises two shafts 51, a slide portion 53, a roller support portion 55, upper rollers 57A, 57B, lower rollers 59A, 59B, and a cam follower 61. The upper rollers 57A, 57B correspond to a first roller. The lower rollers 59A, 59B correspond to a second roller.

The two shafts 51 are arranged side by side at an interval along the direction X. The axial directions of the two shafts 51 are parallel to the directions U, D. The upper ends of the two shafts 51 are each secured to the upper chain 31. The lower ends of the two shafts 51 are each secured to the lower chain 33. When the upper chain 31 and the lower chain 33 rotate in the direction X, the two shafts 51 move in the direction X.

The slide portion 53 has two through holes extending parallel to the directions U, D. The shafts 51 are inserted in the through holes respectively. A bush is mounted inside the through hole. The bush is inserted outside of the shaft 51. Sliding movement between an inner circumferential surface of the bush and an outer circumferential surface of the shaft 51 enables the slide portion 53 to move in the directions U, D.

The roller support portion 55 is secured on an outer peripheral side of the slide portion 53. The outer peripheral side is, as illustrated in FIG. 2, in a direction, when seen from a viewpoint on the direction U side, away from the center of the annular rail unit 21. The roller support portion 55 comprises support plates 63, 65 projecting toward the outer peripheral side. The support plate 65 is arranged on the downward direction D side of the support plate 63.

From a lower surface of the support plate 63, roller shafts 65A, 65B extend in the downward direction D. The roller shafts 65A, 65B are arranged side by side along the direction X. From a lower surface of the support plate 65, roller shafts 67A, 67B extend in the downward direction D. The roller shafts 67A, 67B are arranged side by side along the direction X. The roller shaft 65A and the roller shaft 67A are arranged in a straight line. The roller shaft 65B and the roller shaft 67B are arranged in a straight line.

The upper roller 57A is rotatably mounted to the roller shaft 65A. The axial direction of the upper roller 57A is parallel to the directions U, D. The upper roller 57B is rotatably mounted to the roller shaft 65B. The axial direction of the upper roller 57B is parallel to the directions U, D. The upper rollers 57A, 57B are arranged side by side at an interval along the direction X. The positions of the upper rollers 57A, 57B in the directions U, D are the same. The shapes of the upper rollers 57A, 57B are cylindrical. The diameters of the upper rollers 57A, 57B are the same. The lengths of the upper rollers 57A, 57B in the axial direction are the same.

The lower roller 59A is rotatably mounted to the roller shaft 67A. The axial direction of the lower roller 59A is parallel to the directions U, D. The lower roller 59B is rotatably mounted to the roller shaft 67B. The axial direction of the lower roller 59B is parallel to the directions U, D. The lower rollers 59A, 59B are arranged side by side at an interval along the direction X. The positions of the lower rollers 59A, 59B in the directions U, D are the same. The shapes of the lower rollers 59A, 59B are cylindrical. The diameters of the lower rollers 59A, 59B are the same. The lengths of the lower rollers 59A, 59B in the axial direction are the same.

The lower roller 59A is arranged on the downward direction D side of the upper roller 57A. The rotation axis of the lower roller 59A and the rotation axis of the upper roller 57A lie in a straight line. The upper roller 57A and the lower roller 59A are aligned along an axial direction parallel to the directions U, D. This axial direction is orthogonal to the direction R. The upper roller 57A and the lower roller 59A correspond to a roller unit. The diameter of the lower roller 59A is larger than the diameter of the upper roller 57A.

The lower roller 59B is arranged on the downward direction D side of the upper roller 57B. The rotation axis of the lower roller 59B and the rotation axis of the upper roller 57B lie in a straight line. The upper roller 57B and the lower roller 59B are aligned along an axial direction parallel to the directions U, D. This axial direction is orthogonal to the direction R. The upper roller 57B and the lower roller 59B correspond to a roller unit. Thus, the holding unit 23 comprises the roller unit consisting of the upper roller 57A and the lower roller 59A, and the roller unit consisting of the upper roller 57B and the lower roller 59B. The diameter of the lower roller 59B is larger than the diameter of the upper roller 57B.

As illustrated in FIG. 5 and FIG. 6, the cam follower 61 is mounted to a portion of the slide portion 53 on an inner peripheral side. The inner peripheral side is, as illustrated in FIG. 2, a direction, when seen from a viewpoint on the direction U side, toward the center of the annular rail unit 21. The cam follower 61 protrudes in the inner peripheral side farther than the slide portion 53. The cam follower 61 is inserted in the groove 35 of the upper rail 27 or the groove of the lower rail 29.

As the upper chain 31 and the lower chain 33 rotate in the direction X, the holding unit 23 moves in the direction X. The holding unit 23 can go around the annular rail unit 21.

Sliding movement between the inner circumferential surface of the bush provided in the slide portion 53 and the outer circumferential surface of the shaft 51 enables the holding portion 23 to move in the directions U, D. The directions U, D are parallel to the axial directions of the upper rollers 57A, 57B and the lower rollers 59A, 59B.

However, when the cam follower 61 is inserted in the groove 35 of the upper rail 27, the position of the holding unit 23 in the directions U, D is determined by the upper rail 27. When the cam follower 61 is inserted in the groove 35 of the lower rail 29, the position of the holding unit 23 in the directions U, D is determined by the lower rail 29.

Hereinafter, a state in which the cam follower 61 is inserted in the groove of the upper rail 27 will be referred to as an upward displacement state. A state in which the cam follower 61 is inserted in the groove 35 of the lower rail 29 will be referred to as a downward displacement state. In the upward displacement state, the holding unit 23 is located further on the direction U side than in the downward displacement state.

Figure 7:
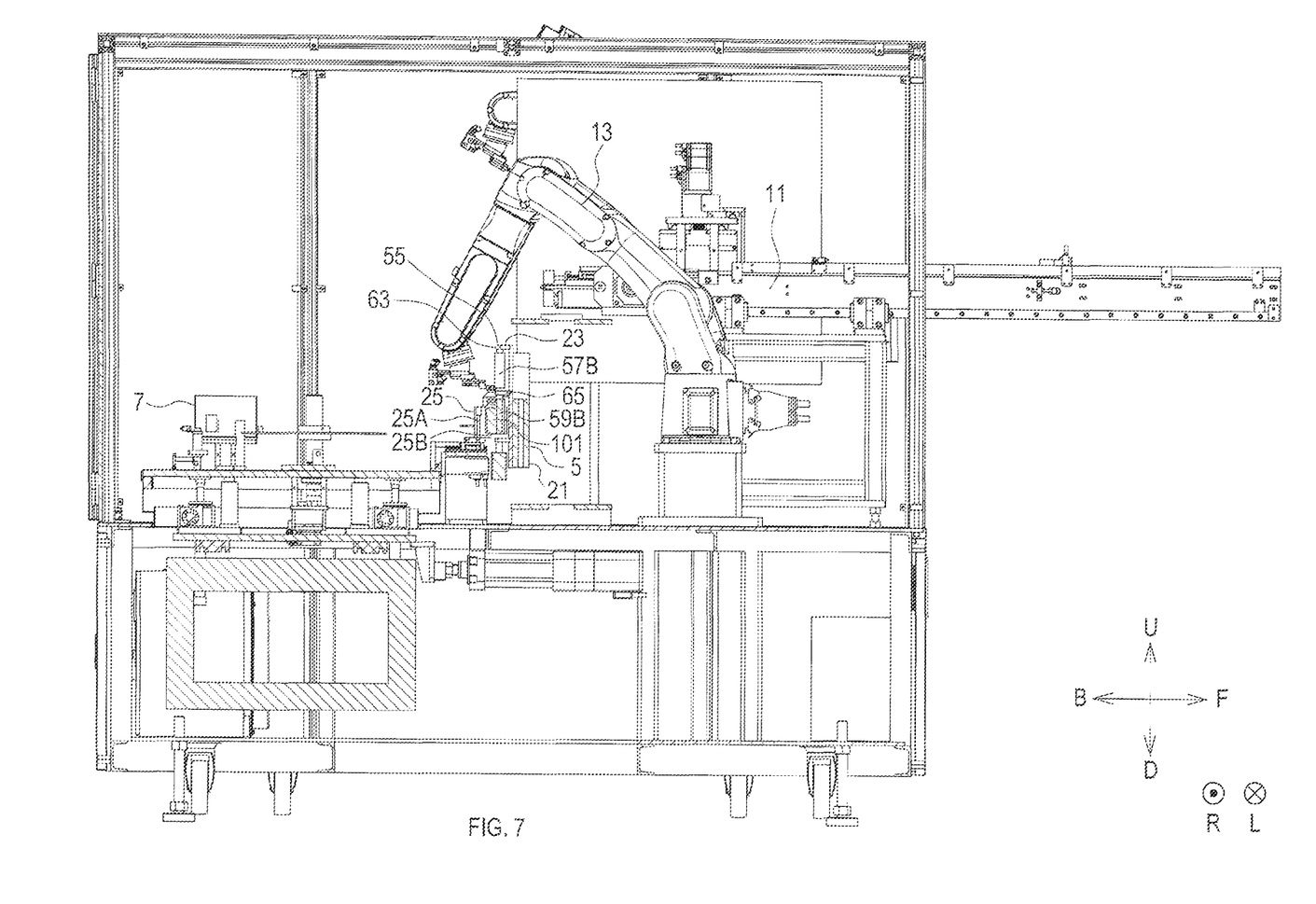
FIG. 7 is a vertical cross-sectional view illustrating a configuration of the rail unit 21, the holding unit 23, and a guide 25.

As illustrated in FIG. 1, the guide 25 is an elongated member extending parallel to the directions L, R. As illustrated in FIG. 1 and FIG. 7, the guide is arranged on the direction B side of the rail unit 21 and the holding unit 23. As illustrated in FIG. 7, the guide 25 has, when seen from a viewpoint on the direction R side, an L-shape consisting of a side plate 25A and a bottom plate 25B. The side plate 25A extends parallel to the directions U, D. The bottom plate 25B extends from the lower end of the side plate 25A in the direction F.

In the upward displacement state, as illustrated in FIG. 7, the lower rollers 59A, 59B face the guide 25. In the downward displacement state, the upper rollers 57A, 57B face the guide 25. That is, the holding unit 23 moves in the directions U, D to thereby switch the rollers facing the guide 25 between the upper rollers 57A, 57B and the lower rollers 59A, 59B.

The rotation axis of the upper roller 57A and the rotation axis of the lower roller 59A are both parallel to the directions U, D and lie in a straight line. The diameter of the lower roller 59A is larger than the diameter of the upper roller 57A. The rotation axis of the upper roller 57B and the rotation axis of the lower roller 59B are both parallel to the directions U, D and lie in a straight line. The diameter of the lower roller 59B is larger than the diameter of the upper roller 57B.

Thus, a distance between the guide 25 and the lower rollers 59A, 59B in the upward displacement state is smaller than a distance between the guide 25 and the upper rollers 57A, 57B in the downward displacement state.

Figure 12:
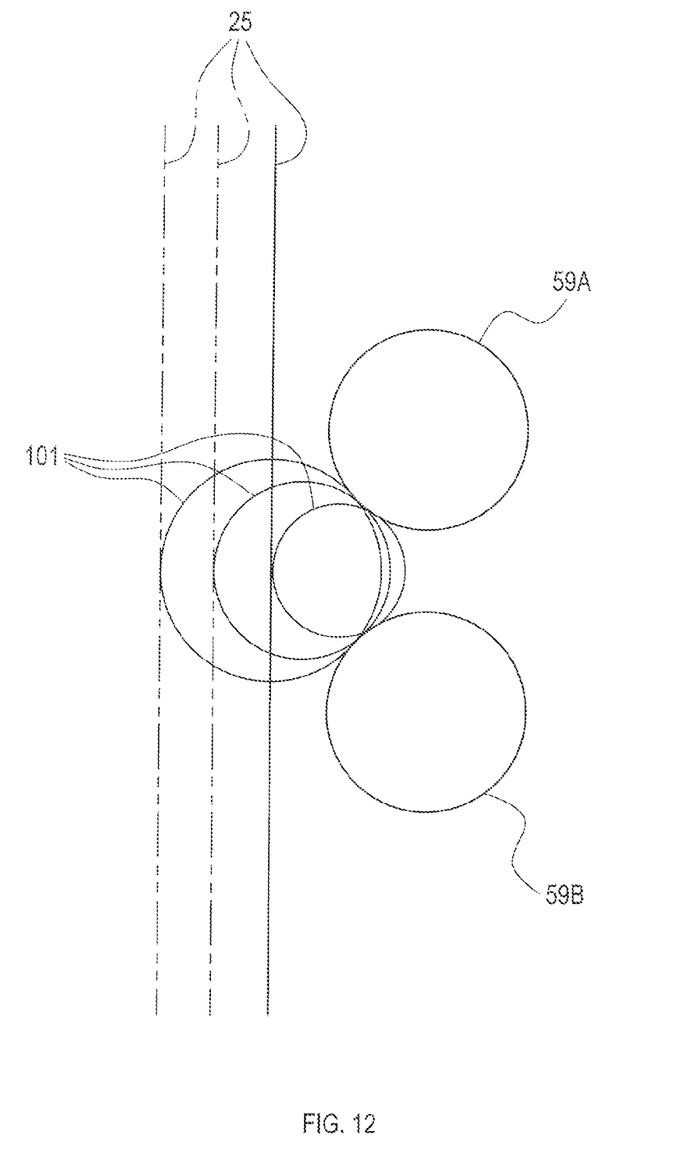
FIG. 12 is an explanatory view illustrating movement of the guide 25.

As illustrated in FIG. 12, the guide 25 can move in the directions F, B. The further the guide 25 moves in the direction B, the more the guide 25 separates from the upper rollers 57A, 57B or the lower rollers 59A, 59B. For example, the larger the diameter of containers to be transported is, the further the position of the guide 25 may be moved toward the direction B side.

3. Process Performed by Transport Device 5

A process performed by the transport device 5 will be described. The container introduction device 3 introduces containers 101 to the introduction positions 15 in the transport device 5. The container 101 has, for example, a cylindrical body portion. The introduction positions 15 are positions located on the direction B side and the direction L side in the transport device 5. At the introduction positions 15, the holding unit 23 holds, as illustrated in FIG. 7, one container 101 between the holding unit 23 and the guide 25.

Figure 8:
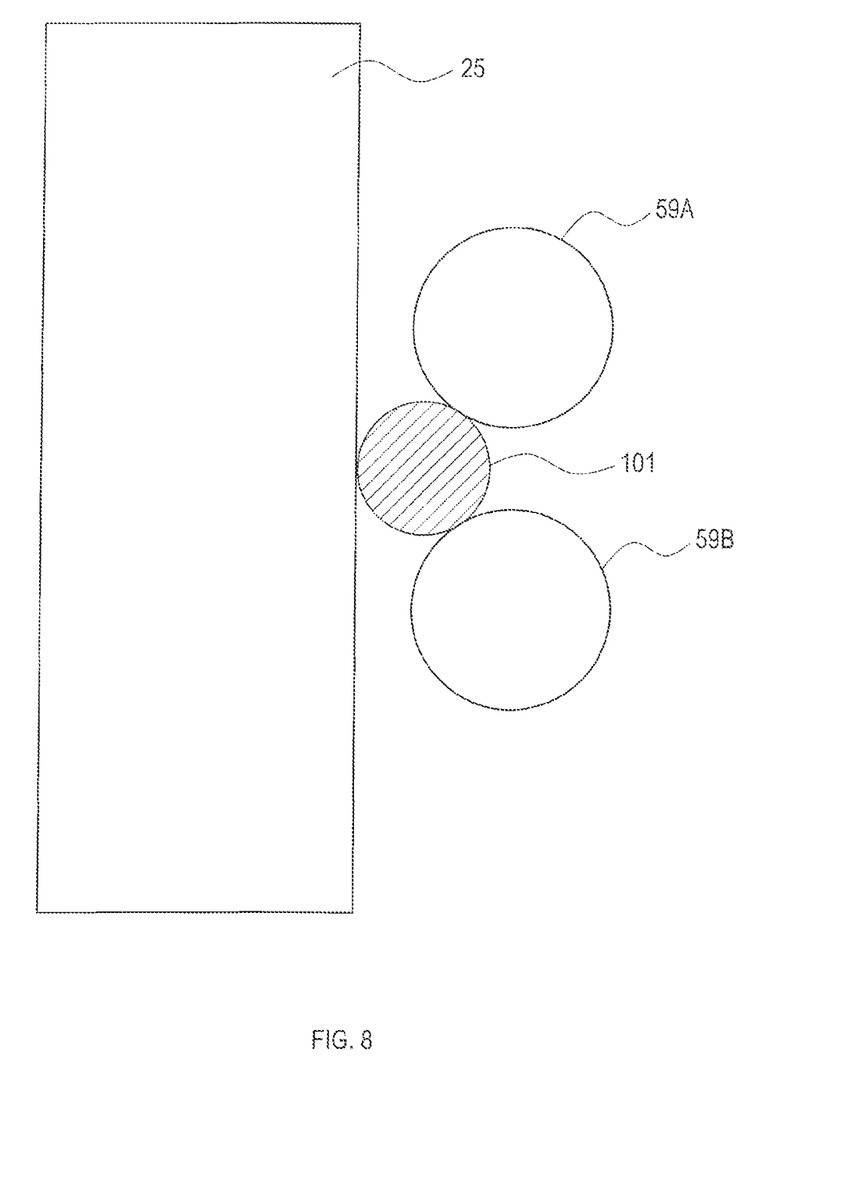
FIG. 8 is an explanatory view illustrating a state in which a container 101 is held by lower rollers 59A, 59B and the guide 25.

In the upward displacement state, as illustrated in FIG. 7 and FIG. 8, the container 101 is held by the lower rollers 59A, 59B and the guide 25. The lower rollers 59A, 59B abut a side surface of the container 101. The side plate 25A of the guide 25 abuts the side surface of the container 101, and the bottom plate supports a bottom surface of the container 101 from below. The lower rollers 59A, 59B and the side plate 25A hold the container 101 from both sides. The lower rollers 59A, 59B and the guide 25 hold, for example, the cylindrical body portion of the container 101.

Figure 9:
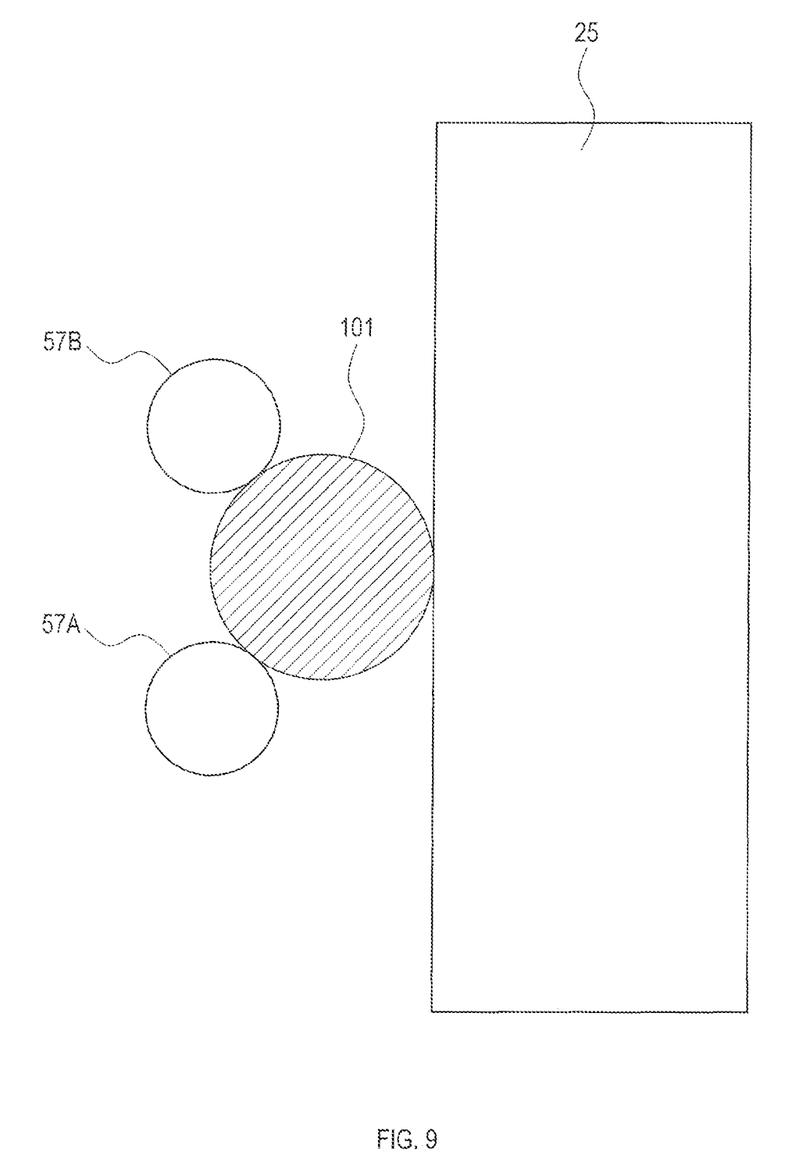
FIG. 9 is an explanatory view illustrating a state in which the container 101 is held by upper rollers 57A, 57B and the guide 25.

In the downward displacement state, as illustrated in FIG. 9, the container 101 is held by the upper rollers 57A, 57B and the guide 25. The upper rollers 57A, 57B abut the side surface of the container 101. The side plate 25A of the guide 25 abuts the side surface of the container 101, and the bottom plate 25B supports the bottom surface of the container 101 from below. The upper rollers 57A, 57B and the side plate 25A hold the container 101 from both sides. The upper rollers 57A, 57B and the guide 25 hold, for example, the cylindrical body portion of the container 101.

As mentioned above, the holding unit 23 moves in the directions U, D to thereby switch the rollers abutting the container 101 between the upper rollers 57A, 57B and the lower rollers 59A, 59B.

The holding unit 23, while holding the container 101, moves in the direction R. The container 101 slidingly moves along the surface of the guide in the direction R. By the process above, the transport device 5 transports the containers 101 in the direction R. The transport direction of the containers 101 is a direction along a straight line.

The transport device 5 can be switched from the upward displacement state to the downward displacement state as described below. In the upward displacement state, the cam follower 61 is inserted in the groove 35 of the upper rail 27. The position of the first stopper 451 of the first air cylinder 41 illustrated in FIG. 10 is set to the position where the groove 35 of the upper rail 27 is closed and the groove 35 of the path switching rail 37 is opened. Also, the position of the second stopper 452 of the second air cylinder 43 is set to the position where the groove 35 of the lower rail 29 is closed and the groove 35 of the path switching rail 37 is opened. The cam follower 61 travels from the upper rail 27 to the lower rail 29 via the path switching rail 37. As a result, the upward displacement state is switched to the downward displacement state.

In order to maintain the upward displacement state, the position of the first stopper 451 of the first air cylinder 41 illustrated in FIG. 10 is set to the position where the groove 35 of the upper rail 27 is opened and the groove 35 of the path switching rail 37 is closed. Also, the position of the second stopper 452 of the second air cylinder 43 is set to the position where the groove 35 of the lower rail 29 is opened and the groove 35 of the path switching rail 37 is closed. The cam follower 61 does not enter the path switching rail 37 and remains inserted in the groove 35 of the upper rail 27.

The transport device 5 can be switched from the downward displacement state to the upward displacement state as described below. In the downward displacement state, the cam follower 61 is inserted in the groove 35 of the lower rail 29. The position of the third stopper 453 of the third air cylinder 47 illustrated in FIG. 11 is set to the position where the groove 35 of the lower rail 29 is closed and the groove 35 of the path switching rail 39 is opened. Also, the position of the fourth stopper 454 of the fourth air cylinder 49 is set to the position where the groove 35 of the upper rail 27 is closed and the groove 35 of the path switching rail 39 is opened. The cam follower 61 travels from the lower rail 29 to the upper rail 27 via the path switching rail 39. As a result, the downward displacement state is switched to the upward displacement state.

In order to maintain the downward displacement state, the position of the third stopper 453 of the third air cylinder 47 illustrated in FIG. 11 is set to the position where the groove 35 of the lower rail 29 is opened and the groove 35 of the path switching rail 39 is closed. Also, the position of the fourth stopper 454 of the fourth air cylinder 49 is set to the position where the groove 35 of the upper rail 27 is opened and the groove 35 of the path switching rail 39 is closed. The cam follower 61 does not enter the path switching rail 39 and remains inserted in the groove 35 of the lower rail 29.

4. Effects Achieved by Transport Device 5

(1A) The transport device 5 can be set to the upward displacement state and the downward displacement state. The distance between the guide 25 and the lower rollers 59A, 59B in the upward displacement state is smaller than the distance between the guide 25 and the upper rollers 57A, 57B in the downward displacement state.

In a case where, for example, containers to be transported are large, the transport device 5 can be set to the downward displacement state so as to increase the distance between the guide 25 and the upper rollers 57A, 57B. Moreover, in a case where, for example, containers to be transported are small, the transport device 5 can be set to the upward displacement state so as to reduce the distance between the guide 25 and the lower rollers 59A, 59B. Thus, the transport device 5 can transport two or more types of containers without necessarily requiring a change of parts.

(1B) The holding unit 23 can move in the directions U, D. The transport device 5 transports the containers in the direction R. Thus, the holding unit 23 can move in a direction orthogonal to the transport direction of containers. Accordingly, the transport device 5 can efficiently perform switchover from the upward displacement state to the downward displacement state and switchover from the downward displacement state to the upward displacement state.

(1C) The guide 25 is movable in the direction toward the holding unit 23 or the direction away from the holding unit 23. The transport device 5 moves the guide 25 to thereby enable adjustment of the distance between the guide 25 and the holding unit 23 depending on the containers to be transported.

(1D) The transport direction in which the transport device 5 transports the containers is a direction along a straight line. Thus, the transport device 5 can efficiently transport containers.

(1E) The transport device 5 is part of the labeling system 1. Thus, the labeling system 1 can transport two or more types of containers without necessarily requiring a change of parts.

Other Embodiments

Although an embodiment of the present disclosure has been described above, the present disclosure should not be limited to the above-described embodiment, and can be embodied in variously modified forms.

(1) The transport device 5 may be a device that transports articles other than containers.

(2) The transport device 5 may be part of a system other than the labeling system 1.

(3) The holding unit 23 may comprise a roller unit in which three or more rollers are aligned in an axial direction. The three or more rollers may have different diameters respectively, for example. Examples of the number of rollers aligned in an axial direction comprise 3, 4, 5, 6, 7, and so on.

(4) In the first embodiment, the holding unit 23 comprises two roller units. The number of the roller units provided in the holding unit 23 may be three or more.

(5) The transport device 5 may transport the containers along a partly or wholly curved transport path.

(6) The diameter of the upper rollers 57A, 57B may be larger than the diameter of the lower rollers 59A, 59B.

(7) A function or functions of one component in each of the aforementioned embodiments may be assigned to two or more components, or a function or functions of two or more components may be achieved by one component. Furthermore, part of the configurations of each of the aforementioned embodiments may be omitted. Moreover, addition, replacement and so on of at least part of the configurations of each of the aforementioned embodiments may be performed with respect to other configurations of the aforementioned embodiments.

(8) In addition to the transport device described above, the present disclosure may be achieved in various forms such as a system having the transport device as a component, a program for enabling a computer to function as part of the transport device, a non-transitory tangible storage medium such as a semiconductor memory in which the program is recorded, and a method of transporting articles.

What is claimed is:

1. A transport device configured to transport an article, the transport device comprising:
   a guide extending in a transport direction of the article; and
   a holding unit configured to hold the article between the holding unit and the guide and to move in the transport direction,
   wherein the holding unit comprises two or more roller units in each of which two or more rollers, including a first roller and a second roller with a diameter larger than a diameter of the first roller, are aligned along an axial direction,
   wherein the holding unit is configured to be movable in the axial direction, and
   wherein the transport device is configured such that the holding unit moves in the axial direction to thereby switch the rollers abutting the article among the two or more rollers.

2. The transport device according to claim 1,
   wherein the axial direction is orthogonal to the transport direction.

3. The transport device according to claim 1,
   wherein the guide is configured to be movable in a direction toward the holding unit, or a direction away from the holding unit.

4. The transport device according to claim 1,
   wherein, in at least a portion of a transport path of the article, the transport direction is a direction along a straight line.

5. The transport device according to claim 1,
   wherein the article is a container, and
   wherein the transport device is part of a labeling system configured to attach a label to the container.

6. The transport device according to claim 1, further comprising:
   a first rail; and
   a second rail,
   wherein the holding unit is configured to be switched between a state in which a position of the holding unit in the axial direction is determined by the first rail and a state in which the position is determined by the second rail to be thereby moved in the axial direction.

* * * * *